Patented May 3, 1938

2,115,815

UNITED STATES PATENT OFFICE 2,115,815

CONCENTRATES FROM VEGETABLES, FRUITS, OR BERRIES, AND THEIR MANUFACTURE

David L. Johnson, Glenside, Pa.

No Drawing. Application August 5, 1936, Serial No. 94,414

21 Claims. (Cl. 99—205)

This invention relates to concentrated products from vegetables and the like, including fruits and berries. I aim to produce concentrates in which all the essential qualities and values of the natural vegetable or the like may be retained substantially unaltered,—including the natural flavor, aroma, color, food value, mineral salts, and vitamins, etc. This I accomplish, essentially, by separating the true liquid of the vegetable from the insoluble solid matter, concentrating this liquid separately, and afterward recombining it with the solid matter,—or with so much of the solid matter as it is desired to have in the final product. Thus I do not have to subject the insoluble solids to the heat required in concentrating the liquid conveniently and economically. Accordingly, the properties of the solids that are essential to the characteristic qualities and values of the vegetable or the like are neither lost nor modified, as in ordinary processes. My concentrates can be so prepared as to be stable enough to keep indefinitely without expensive special measures, such as refrigeration.

This application is a continuation, in part, of my pending application Serial No. 685,742, filed August 18, 1933.

Superficially regarded, vegetables, fruits, and berries consist of inert matter such as skin, seeds, and core; of meat or "pulp", as it is sometimes rather loosely termed; and of liquid juice. Sometimes much of the liquid juice is obviously apparent as liquid in interstices afforded by the natural structure of the vegetable or the like, or of its meat; sometimes most or all of the juice is so held in the physical structure of the meat as to be almost unobserved, or only apparent as a slightly moist condition of the meat.

More essentially, vegetables and the like consist of the following distinct parts:

(1) Inert waste materials, comprising skin, seeds, and core or the like, which are hereinafter referred to collectively as coarse solids, or as "pomace",—though sometimes confusingly refered to in the art as "pulp".

(2) Insoluble edible solids, which in the natural vegetable or the like are mainly embodied in the meat or "flesh", and are hereinafter referred to as "insoluble solids", or "juice solids", "meat solids", or "plastic constituents".

(3) The truly liquid portion, sometimes largely apparent in the obvious free juice of the natural vegetable or the like, but often mainly held in the physical structure of the meat, as already mentioned.

Extracted juices of vegetables, fruits, or berries are separable, as described hereinafter, into liquid and plastic fractions, the former consisting substantially of the true liquid, and the latter to be essentially characterized as comprising the juice or meat solids. This is why the insoluble solids are sometimes referred to as "plastic constituents", as above mentioned.

A variety of methods may be employed for segregating or separating the true liquid from other portions of vegetables, fruits, or berries, according to the character of the vegetable or the like and of the concentrated product in view, and according to what solid portion(s) of the vegetable or the like is (are) to be retained in the product. For some products in which liquid and meat but no pomace material are retained, the vegetable or the like may be subjected to a "juicing" operation or process, whereby the pomace is segregated in a more or less moist state; the physical structure of the meat is broken down, liberating the liquid therefrom; and the insoluble solids are left more or less suspended in the liquid, forming the extracted juice from such operation. How completely the meat thus reappears in the extracted juice will naturally vary according to the particular vegetable, fruit, or berry, as well as according to the type and efficiency of the juicing operation; and this may be controlled as desired in each case. Even juices that are apparent as such in the vegetable or the like,—or can be obtained therefrom without really breaking down the physical structure of the meat,—generally embody a greater or less amount of insoluble solids, suspended in the true liquid.

Of course, the vegetable, fruit, or berries may undergo any usual preparation or treatment for producing therefrom the type of product sought, so long as the juice is concentrated while separated from the solids.

When extracted in usual ways, as above suggested, the natural juices of vegetables, fruits, and berries comprise a greater or less amount of the true liquid, consisting of water with various substances dissolved therein, and a greater or less amount of insoluble solid matter, more or less in suspension in the liquid. When such juices are allowed to stand, the solid particles tend to settle to the bottom in a layer distinguishable from the supernatant true liquid,—which latter for this reason is distinctively referred to in the art as "supernatant liquid", and is so distinguished hereinafter. The color, flavor, and food values of the natural juice are characteristically included in the solids; while the liquid may be almost colorless, or tinted. Vitamins are usually found in the liquid as well as in the solids, some being soluble and others insoluble.

I have found that it is the insoluble solids of such juices that have been injuriously affected in the production of juice concentrates as heretofore practiced. By separating the supernatant liquid from the solids and concentrating it separately, and afterward recombining it with the solids, I produce a greatly superior concentrate, in which the essential qualities and values of the original juice are so fully retained that by mere addition of water the concentrate can be reverted, virtually, to the original natural juice.

Such a concentrate may be used at soda fountains and the like for dispensing juice beverages, by the addition of water and ice, as well as for flavoring; may be used by ice-cream and pie manufacturers, in lieu of the usual bulky "cold pack", as it is known in the trade; and may also be used by juice canners as a convenient and inexpensive means of storing their reserve stock of juice to meet out-of-season orders, or as a soup base, etc. As particularly desirable for the manufacture of such juice concentrates, I may instance the juices of tomatoes, of the citrus fruits, and of strawberries,—although the latter have not at present acquired popularity for beverage purposes. However, the juices of many other vegetables, fruits, and berries may be similarly concentrated and used, when demand warrants, or may find still other uses.

Besides the vegetables, fruits, and berries which yield freely-fluid juices, such as tomatoes and citrus fruits, there are others whose truly liquid content is, perhaps, relatively less, and which yield products of thicker consistency when put through a "juicing" process. Concentrates from these made according to my process may be found more useful for other purposes than for simple reversion to "juice" by addition of water: e. g., they may be used as a "spread" in lieu of jams or preserves, as well as for the purposes of cold pack in making ice-cream, and as filling for pies. Particularly desirable for such purposes are concentrates from peaches and kindred fruits, and even from strawberries. The concentrates from some of these may advantageously be made thicker than that of tomtato juice would generally be.

In concentrating juices and the like, as I have already indicated, I separate the "juice" (whether freely fluid, or thicker) into two portions: one consisting mainly of the insoluble solids, and the other mainly of the supernatant liquid. This separation may be effected directly after extraction of the juice. If desired for any reason, the juice may be moderately heated before separation, or subjected to any treatment that will not injuriously affect any of its components, as indicated hereinafter. I treat these components of the juice differently, so as to produce the desired ultimate concentration, etc., in the most economical way without injuriously affecting any of the characteristic or desirable qualities or values. The supernatant liquid is treated separately from the solids to concentrate (and stabilize) it, thus avoiding deleterious effects on the solids from the heat used in concentrating the liquid. The solids may be treated either separately, before remixing with the treated and concentrated liquid, or in intermixture with this liquid, since the heat required to stabilize or pasteurize the solids will not injuriously affect the liquid. Both of these modes of carrying out the process are described hereinafter, and in both, it will be observed, the remixing of solids and liquid is subsequent to the concentration of the liquid. In cases where keeping qualities of the final product are immaterial, pasteurizing or stabilizing treatment of the solids may obviously be dispensed with.

Tomato juice is now believed to have an even greater vitamin content than the juices of the citrus fruits, and affords a good example of the advantages of my invention; so that I shall hereinafter explain the invention in detail with particular reference to tomato juice. However, citrus and other fruit juices can be concentrated in the same way.

Vine-ripened tomatoes are prepared as usual and put through any commercial juice extractor or "juicer", such for example as the rotary type sometimes called a "cyclone" or "centrifugal machine",—which is not, however, to be confused with the "centrifugal machine" or "centrifuge" that may be used in separating solid matter from a liquid. The juice thus extracted from the mass of tomato leaves the "juicer" free of seeds or other large solid particles, but does contain the characteristic fine fibrous solid matter hereinbefore referred to. In other words, this extraction of the juice as just described segregates from the rest of the tomato the meat solids that are generally desirable in a tomato juice, along with the true or "supernatant" liquid. For my present purpose, the de-juiced pomace (or "pulp" as it is sometimes miscalled) is only a by-product or a waste product, to be discarded or disposed of as found most practicable.

This extracted natural juice may next undergo the separating treatment, as by being put through centrifuges or filters of any well-known or suitable type, which segregate the insoluble solids and the supernatant liquid from one another. With a basket-type centrifugal having an imperforate, solid-walled basket, a centrifugal force about 1500 times gravity gives very good results. The solids should preferably come from the operation as a moist, plastic "sludge" of about the consistency of commercial "tomato paste". If the solids are of thicker consistency than this, enough of the separated liquid of the juice may be re-added to the solids to thin them to this desirable consistency. Characteristically, the supernatant liquid contains vitamins B and C, which are water-soluble, and the solids contain vitamin A, which is insoluble in water. After their separation, the segregated liquid and solids may (one or both) be deaerated, to minimize oxidation in subsequent treatment as hereinafter described.

Following the separating of these liquid and solid components of the extracted juice from one another, they are further treated separately and differently. For convenience and quickness, these separate treatments may be carried out concurrently. The temperatures hereinafter given are as at sea-level; and the corresponding equivalents are to be used at higher altitudes and in vacuo. Both steps or operations (on supernatant liquid and on solids) should be effected as quickly as possible, to avoid oxidation. I will first describe the separate treatment of the liquid.

After its separation and deaeration (if deaeration is employed), the segregated supernatant liquid is separately concentrated. Preferably this is done by heating in a vacuum pan or vacuum evaporator. The temperatures indicated below will sterilize and thus stabilize the liquid. If this evaporation and concentration is done by the "open kettle" process, the liquid can be rapidly and thoroughly boiled and concentrated at temperatures of 212° F., or higher,—i. e., at the boiling point of the liquid, or higher,—under ordinary atmospheric pressures. However, concentration by a "vacuum" operation is preferred, because it involves less exposure of the liquid to the air, and less likelihood of oxidation; and the vacuum correspondingly reduces the boiling point of the liquid. For either open kettle or vacuum concentration, "simmering" temperatures (below boiling) would require much more time and heat for a given evaporation of water, and are ordinarily without any compensatory advantage. The concentration may be continued until the liquid assumes the consistency of a syrup, requiring usually some 30 to 40 minutes.

As against mere heat, vitamin B, especially, is now considered to be stable at temperatures up to 250° F. at 15 lbs. gauge, for as long as two hours. Vitamin C is considered stable under heat when boiled in vacuum, and remains largely thermo-stable under vigorous boiling. Neither these vitamins nor the mineral matter dissolved in the liquid are seriously affected by the treatment indicated above. Nor does such treatment affect the aroma, color, or food values, because these are not substantially present in the liquid.

If the separation of solids from the juice in the previous centrifuging or filtering has been relatively incomplete, the small amount of solids remaining in the segregated liquid can be skimmed or filtered off during or after the concentration of the liquid, and may be returned to the solids before the treatment thereof as hereinafter described, or may be discarded.

Having thus explained the mode of treatment of the separated liquid of the extracted juice, I will now describe the treatment of the separated solids of the extracted juice.

The separated insoluble solids from the separation operation are treated to stabilize them by heating below boiling, with limited concomitant concentration: i. e., there may be very little reduction in volume. In general, the concentration should not closely approach the point of dryness of the solids, for various reasons. Light but effective "pasteurization" of the solids can be effected in a retort or kettle, or preferably in an anaerobic pasteurizer at temperatures within a range of 140° F. to 185° F., without affecting aroma, flavor, color, etc., and in about half an hour or less. Even treatment for 5 min. has been found to give satisfactory results in some cases. Or the solids may be stabilized by "flash boiling" without serious injury, since such a momentary boiling temperature (lasting not over a minute or two) does little more than pasteurizing. However, any subjection of the solids to boiling temperatures such as 212° F.—however brief it may be—involves a risk of impairing color and flavor; so that pasteurizing is preferred to flash-boiling for stabilizing the solids.

Processing of the solids at higher temperatures than indicated tends (especially if prolonged) to result in destruction or impairment of the natural qualities in the insoluble solids, such as aroma, flavor, color, food and vitamin values, and to impart a cooked flavor. Undue exposure to oxygen in the treatment of the segregated solids is to be avoided; and on this account pasteurizing treatment under vacuum is advantageous, as a means of extracting air adhering or absorbed in the fibers of the solids before the temperature becomes high enough to cause oxidation.

The segregated liquid and solid components of the original juice having been separately treated and concentrated as above described, the final step is to thoroughly mix them together again to form a single practically sterile concentrate of the desired strength. This may be done by hand in an open kettle, or mechanically as by means of a batter mixer. The final concentration may be $\frac{1}{10}$th of the original volume, or greater or less, depending upon the apparatus employed, the amount of insoluble solids in the original juice as extracted, and the ultimate use of the concentrate.

Salt, sugar, spices, flavors, condiments, etc., may be added to the concentrate, if a seasoned or artificially flavored product is desired, as in the manufacture of cocktails, catsups, sauces, etc.

The final concentrate is preferably delivered or charged while hot into suitable shipping or storing containers,—such as jugs, cans, or bottles of appropriate sizes,—which are closed and/or sealed in the usual way. They may be given a hot-water-bath, and then allowed to cool, or cooled artifically. Proper precautions to insure against contamination of the sterile concentrate are preferably taken in connection with the sealing operation, as well as in the previous preparation of the containers.

Having thus explained the more characteristic steps in one preferred mode of carrying out my process, I will now explain briefly certain variations and accessory operations.

Alternatively to complete separate treatment of both segregated components of the original juice, and in cases where the proportions and temperatures of the solids and of the segregated and concentrated liquid are suitable therefor, pasteurization of the insoluble solids may be effected by the very act of remixing them with the hot concentrated syrup of the liquid, with little or no previous separate heating of the solids. Or if the heat of the concentrated liquid should be insufficient to thus bring the solids to pasteurizing or stabilizing temperature,—or the liquid should cool before remixing with the solids,—the intermixture of concentrated liquid and solids may be heated up in any convenient way to effect the stabilization of the solids. These procedures are essentially alike in that in both cases the remixing of concentrated liquid and solids really precedes the heating of the solids, and in both the solids are heated through the medium of the liquid: the difference is as to just when external heat is applied to the liquid.

All of the procedure above described may be modified as regards selection of apparatus employed, degree of vacuum, and application of heat, to meet the requirements of different qualities of segregated liquids and solids from the raw juices of various different fruits and vegetables.

If the concentrate is to be dispensed over the counter, a portion of the concentrate is injected into a beverage glass, for example ¼ of the content of the glass, and plain or carbonated water is then added to fill the glass, and stirred with a spoon before serving. The result of adding water to the concentrate is a juice which contains substantially all of the desirable qualities of the original juice, without substantial loss of any qualities which give value to the original juice when used for human consumption.

If used in place of "cold pack", the manufacturer of ice-cream, candies, or pies may or may not dilute it, but must add sugar.

Juices of other berries and fruits (such as strawberries and apricots or peaches) which have not at present acquired popularity for beverage purposes can be concentrated as above described, and used as a "spread" in the place of jams or preserves, and as a substitute for "cold pack" for manufacturers of ice-cream and pies. The usual commercial "cold pack" is made by packing layers of fruit between layers of sugar in a large barrel or hogshead. These expensive containers, when packed, are kept under refrigeration, both in storage and while being shipped to the customer. My concentrate is smaller in bulk, can be shipped in cheaper containers such as large cans, and does not require refrigeration during storage or shipment. With a strawberry concentrate, particularly for flavoring ice-cream, the seeds should be retained in the original juice when any pomace of the berries is eliminated at the juicer.

Treating the supernatant liquid of vegetables or the like while separated from the insoluble solid matter thereof obviates injury of the insoluble solids by any excess of heat used to concentrate the liquid, whether such excess be (1) in the degree of heat or temperature employed, or (2) in the duration of heating required to effect the desired concentration. In the processing of tomato juice as described, this advantage is illustrated by the fact that the best flavor of the product is assured when the solids are stabilized by mere pasteurization at about 140 to 185° F., although they may without great impairment be stabilized by flash-boiling, with a momentary temperature of 212° F. or thereabout, as already mentioned.

Throughout this specification and in various claims, I have used the terms "stabilize" and "stabilizing temperature" in a generic sense, to express the preservative effect of heat against the usual spoiling of the component substances of vegetables, fruits, berries, and their juices, and as including (unless qualified by the context) either the lower range of temperatures commonly employed to effect the preservative and conservative partial sterilization known as "pasteurization", or a higher range of temperatures, up to 212° F., or over. If only momentary, as in flash boiling, such higher temperatures may likewise have a merely pasteurizing effect, as hereinbefore stated; but when prolonged, they produce the total extinction of all organic life that is properly termed "sterilization",—generally accompanied by objectionable change in natural food substances thus treated. While such sterilization impairs the insoluble solids of vegetables, fruits, and berries, it preserves and conserves their supernatant liquid unimpaired, as hereinbefore explained.

The centrifugal separation of solids from supernatant liquid as described above is highly efficient, leaving the liquid with a solid content so trifling (1% or less) as to have no sensible effect on the final product. On the other hand, it requires no great amount of solids present in the liquid during concentration thereof to spoil the flavor of the product because of the bad effects of heat on the solids: i. e., as little as some 5% of solids present in the liquid during concentration may give a very noticeable cooked flavor to the final product. Accordingly, I have in various claims referred to the supernatant liquid as substantially free of insoluble solids, as contrasted with the presence of such solids in any amount materially and objectionably affecting the quality of the final product.

Having thus described my invention, I claim:

1. A process of preparing a concentrated product consisting of insoluble solids and supernatant liquid of vegetables, fruit, or berries; which process comprises segregating, separate from one another and from the rest of the vegetable, fruit, or berries, its supernatant liquid substantially free of insoluble solids, and its insoluble meat solids which it is desired to have in the final product, evaporating off part of the water from the segregated solid-free supernatant liquid, at temperatures high enough to injure the said solids, and mixing together the concentrated liquid and the segregated solids.

2. A process of preparing a concentrated product consisting of insoluble solids and supernatant liquid of vegetables, fruit, or berries; which process comprises segregating, separate from one another and from the rest of the vegetable, fruit, or berries, its supernatant liquid substantially free of insoluble solids, and its insoluble meat solids which it is desired to have in the final product, evaporating off superfluous water from the supernatant liquid and thereby concentrating and sterilizing it, and mixing together the concentrated liquid and the segregated insoluble solids; thus forming a juice concentrate having a reduced water content, but possessing substantially unimpaired the original qualities of the components.

3. A process of preparing a stable concentrated product consisting of insoluble solids and supernatant liquid of vegetables, fruit, or berries; which process comprises segregating, separate from one another, the supernatant liquid of the vegetable, fruit, or berries substantially free of insoluble solids, and the insoluble solids thereof which it is desired to have in the final product, evaporating off superfluous water from the segregated supernatant liquid at stabilizing temperature over a length of time that would injure the solids, thus concentrating this liquid, heating the solids to a stabilizing temperature and for a shorter length of time that do not injure them, and also mixing together the solids and supernatant liquid subsequently to the concentration of the liquid as aforesaid; all finally resulting in a stable concentrate possessing substantially unimpaired the original qualities of the components.

4. A process of preparing a stable concentrated product consisting of insoluble solids and supernatant liquid of vegetables, fruit, or berries; which process comprises segregating, separate from one another, the supernatant liquid of the vegetable, fruit, or berries substantially free of insoluble solids, and the insoluble solids thereof which it is desired to have in the final product, evaporating off superfluous water from the segregated supernatant liquid at sterilizing temperature, thus concentrating this liquid, heating the solids to a lower stabilizing temperature only, that does not injure them, and also mixing together the solids and supernatant liquid subsequently to the concentration of the liquid as aforesaid; all finally resulting in a stable concentrate of reduced water content but possessing substantially unimpaired the original qualities of the components.

5. A process of preparing a concentrated, stable, pomace-free product consisting of insoluble solids and supernatant liquid of vegetables, fruits, or berries; which process comprises segregating the pomace-free product to be concentrated from the rest of the vegetable, fruit, or berries, separating from one another the supernatant liquid component of this product substantially free of insoluble solids, and the insoluble solids of said product, heating and concentrating the liquid component separately at sterilizing temperature, heating the solids to a stabilizing temperature without injuring them, and also mixing together the solids and supernatant liquid subsequently to the concentration of the liquid as aforesaid; all finally resulting in a stable concentrate of reduced water content, but possessing substantially unimpaired the original qualities of the pomace-free product treated.

6. A process of preparing a stable juice-concentrate from vegetables, fruits, or berries; which process comprises the segregation, separate from one another, of the supernatant liquid component thereof substantially free of insoluble solids, and the insoluble juice-solids thereof, the concentration and stabilization of the supernatant liquid and the solids, the liquid separately concentrated and stabilized by boiling, and the solids stabilized by heat treatment at a temperature between substantially 185° F. and 212° F. for so short a time as to avoid impairing them; and the mixture with one another of the supernatant liquid and the solids, subsequently to the concentration of the liquid as aforesaid.

7. A process of concentrating the extracted pomace-free juice of vegetables, fruits, and berries, which comprises mechanically separating substantially all of the insoluble solids of the juice from the liquid portion thereof, evaporating off part of the water from the liquid portion after the separation, at temperatures high enough to injure the said solids, and recombining the separated solids with the concentrated liquid.

8. An improvement in concentrating the extracted pomace-free juices of vegetables, fruits, and berries, which comprises segregating the insoluble solids of such juice, and the supernatant liquid portion thereof substantially free of insoluble solids, evaporating off superfluous water from the separated liquid, thereby concentrating and sterilizing it without impairing the original characteristics of the juice, and mixing together the solids and the concentrated liquid.

9. A process of concentrating the extracted pomace-free juices of vegetables, fruits, and berries; which process comprises segregating the insoluble solids of such juice, and the supernatant liquid portion thereof substantially free of insoluble solids, boiling off superfluous water from the separated liquid, pasteurizing the solids without injuring them, and also mixing together the solids and supernatant liquid subsequently to the concentration of the liquid as aforesaid; all without substantially impairing the original characteristics of the juice.

10. A process of concentrating the extracted pomace-free juices of vegetables, fruits, and berries; which process comprises segregating the insoluble solids of such juice, and the supernatant liquid portion thereof substantially free of insoluble solids, de-aerating these segregated components of the original juice, boiling off superfluous water from the liquid, thus concentrating and stabilizing this liquid, heating the solids to stabilizing temperature without injuring them, and also mixing together the solids and supernatant liquid subsequently to the concentration of the liquid as aforesaid; all without impairing in the concentrated mixture the original characteristics of the juice.

11. A process of concentrating the extracted pomace-free juices of vegetables, fruits, and berries; which process comprises segregating the insoluble solids of such juice, and the supernatant liquid portion thereof substantially free of insoluble solids, boiling off superfluous water from the liquid in vacuo, thus concentrating and stabilizing this liquid, stabilizing the solids by heat at a lower temperature than employed in boiling the liquid without injuring them, and also mixing together the solids and supernatant liquid subsequently to the concentration of the liquid as aforesaid; all without substantially destroying the original characteristics of the juice.

12. The process of concentrating the juice of vegetables, fruits, and berries which comprises the extraction of the juice only, separated from the pomace, the separation of the supernatant liquid component substantially completely from the insoluble solids in the juice, the concentration and stabilization of these components, the supernatant liquid concentrated by heat equal to or exceeding 212° F., the insoluble solids stabilized by heat at a temperature less than 212° F. without injuring them, and the thorough commingling of the solids and the concentrated liquid, all resulting in a single concentrate having substantially the same qualities as the original juice, excepting water.

13. A process of concentrating the extracted pomace-free juices of vegetables, fruits, and berries; which process comprises segregating the insoluble solids of such juice, and the supernatant liquid portion thereof substantially free of insoluble solids, concentrating and sterilizing the supernatant liquid by heating up to 212° F. or higher, pasteurizing the solids at temperatures not, substantially, exceeding 185° F. without injuring them, and also mixing together the solids and supernatant liquid subsequently to the concentration of the liquid as aforesaid; all without impairing in the concentrated mixture the original characteristics of the juice.

14. A process of preparing a concentrated product consisting of insoluble solids and supernatant liquid of vegetables, fruit, or berries; which process comprises segregating, separate from one another, the supernatant liquid of the vegetable, fruit or berries substantially free of insoluble solids, and the insoluble solids thereof which it is desired to have in the final product, evaporating off superfluous water from the liquid, thereby concentrating and stabilizing it, and mixing together the concentrated liquid and insoluble solids, and heating the latter to a stabilizing temperature in intermixture with the former, without injuring the solids; all without impairing the original characteristics of the components.

15. A process of preparing a concentrated product consisting of insoluble solids and supernatant liquid of vegetables, fruits, or berries; which process comprises segregating, separate from one another, the supernatant liquid of the vegetable, fruit, or berries substantially free of insoluble solids, and the insoluble solids thereof which it is desired to have in the final product, evaporating off superfluous water from the liquid at sterilizing temperature, mixing together the concentrated liquid and insoluble solids, and heating the latter to a lower stabilizing temperature in intermixture with the former, without injuring the solids; all without impairing the original characteristics of the components.

16. A process of preparing a concentrated product consisting of insoluble solids and supernatant liquid of vegetables, fruit, or berries; which process comprises segregating, separate from one another, the supernatant liquid of the vegetable, fruit, or berries substantially free of insoluble solids, and the insoluble solids thereof which it is desired to have in the final product, evaporating off superfluous water from the liquid at a stabilizing temperature over a length of time that would injure the segregated solids, mixing together the concentrated liquid and the segregated insoluble solids, and heating the mixture to a stabilizing temperature, but only for a shorter length of time that does not injure the solids; all without impairing the original characteristics of the components.

17. A process of concentrating the extracted pomace-free juices of vegetables, fruits, and berries; which process comprises segregating the insoluble solids of such juice, and the supernatant liquid portion thereof substantially free of insoluble solids, boiling off superfluous water from the liquid, thereby concentrating and sterilizing it, and mixing the solids with the heated liquid, thereby also pasteurizing the solids by the heat of the liquid, all without impairing in the concentrated mixture the original characteristics of the juice.

18. A process of concentrating the extracted pomace-free juices of vegetables, fruits, and berries; which process comprises segregating the insoluble solids of such juice, and the supernatant liquid portion thereof substantially free of insoluble solids, separately sterilizing and concentrating the separated liquid and pasteurizing the solid components, by heat, the latter at a lower temperature than the former, so as to leave the original characteristics of both components substantially unimpaired, and mixing together the separately treated liquid and solids.

19. A method of concentrating a fruit juice, in which the plastic constituents are in suspension in an aqueous liquid, which comprises mechanically separating substantially all of said plastic constituents from said liquid; evaporating, at temperatures sufficiently high to be injurious to components of the plastic fraction, a portion of the water from said liquid after the separation; maintaining said plastic constituents at not substantially higher than atmospheric temperature; and recombining the separated plastic constituents with the concentrated liquid.

20. The method of preparing a concentrated fruit juice which comprises separating coarse material therefrom, then separating the insoluble solids of the juice from the liquid portion thereof, whereby said separated portion is substantially free of insoluble solids, boiling the liquid to concentrate and sterilize it, maintaining said separated insoluble solids without applying heat, and recombining the separated solids with the concentrated liquid.

21. A method of concentrating a fruit juice, in which the plastic constituents are in suspension in an aqueous liquid, which comprises clarifying said juice by removing coarse solids therefrom; subjecting the clarified juice to a high centrifugal force, and thereby separating a plastic fraction comprising said plastic constituents from a liquid fraction substantially free of plastic constituents; concentrating said liquid fraction at temperatures sufficiently high to be injurious to components of the plastic fraction; maintaining said plastic fraction at not substantially higher than atmospheric temperature; and blending the concentrated fraction with the plastic fraction in desired proportions.

DAVID L. JOHNSON.